Dec. 23, 1952

N. GOULOUNÈS ET AL 2,622,342

APPARATUS FOR THE DRYING OF GRANULAR
AND POWDERY MATERIALS

Filed May 2, 1950

INVENTORS
NOËL GOULOUNÈS AND
ALBERT EDOUARD CAILLAT

By *Linton and Linton*
ATTORNEYS

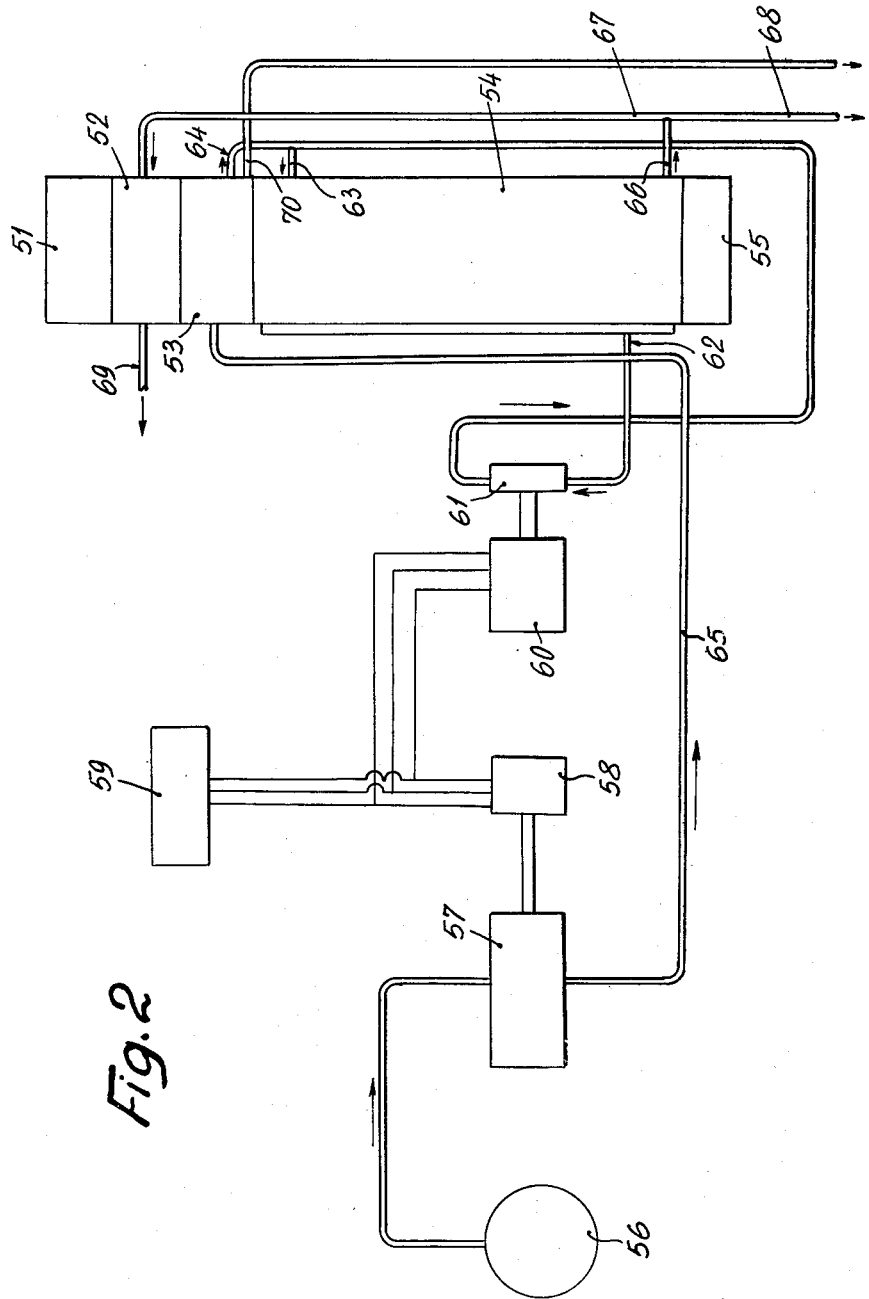

Patented Dec. 23, 1952

2,622,342

UNITED STATES PATENT OFFICE 2,622,342

APPARATUS FOR THE DRYING OF GRANULAR AND POWDERY MATERIALS

Noël Goulounès, Saint-Cheron, and Albert Edouard Caillat, Paris, France

Application May 2, 1950, Serial No. 159,534
In France May 23, 1949

5 Claims. (Cl. 34—65)

The drying of granular or powdery material is carried out at the present time by means of methods that consume amounts of energy in excess of the thermal energy for evaporation of the water to be removed. Suggestions have been made already for the recovery of the energy used for the evaporation of the water withdrawn from materials treated by compressing the water-vapour obtained in a high-pressure machine, according to the principle of the thermal pump, and by causing it to go then into a unit when it condenses while supplying heat-units that are transferred to the materials to be treated by means of a fluid agent.

If the adoption of the principle of the thermal pump enables the drying of materials to be effected theoretically with an expenditure of less energy than the heat energy consumed in the evaporation of the removed water, this adoption is only of interest in practice if the thermal pump operates between two temperatures that are close enough and for that reason the number of heat exchanges must be kept to the lowest figure and it is necessary to ensure these exchanges under conditions giving rise to a high transfer coefficient. In addition, for plants on an industrial scale that are intended for the treatment of a considerable tonnage of materials, it is advisable to bring in as small a bulk as possible of fluids. On the other hand, in large plants of this nature, it is desirable to carry out drying under atmospheric pressure so as to avoid the trouble of obtaining watertight conditions and the structural difficulties that occur when conducting the drying operation under a vacuum.

The object of our invention is to perfect a method and drying equipment that ensures the recovery of the energy used for the evaporation of the removed water and that makes certain that use will be made of it for the drying of the material being treated, while enabling the heat exchanges to be made with high transfer coefficients and the bringing into action of as small a fluid bulk as possible for the treatment of a given tonnage of materials, these results being obtained with the assistance of uncomplicated equipment that does not call for any particular watertight condition for the tank in which the material is undergoing drying treatment.

The method that enables these results to be obtained, in accordance with our invention, lies mainly in causing the water-vapour to circulate through a heating section formed preferably by pipes that are arranged inside a tank containing the materials to be dried at ordinary pressure and that are directly in contact with these materials so that, by condensing, this vapour may supply the materials with the heat required for the evaporation of the contained moisture, while the water-vapour created in the bulk of the materials is removed and sent back by a pressure boosting pump through this same heating section.

The heat from evaporation of the removed moisture is thus recovered and only a slight amount of external heat is used up, without bringing into action a fluid intermediate between the heating vapour and the materials to be dried, while the obtaining of a high heat-transfer coefficient as a consequence of the direct contact of the material with the heating section where the vapour condenses enables a considerable tonnage of materials to be dried without causing the circulation of an undue bulk of fluid, and without having to call on too large an area of exchange surfaces.

Use is made to advantage of the heat of the water resulting from the condensing of heating vapour for the pre-heating of the materials subjected to drying.

While in the methods adopted at the present time, it did not seem worthwhile to recover the sensitive heat from the materials discharged after drying, since this recovery would have been, in relation to the total expenditure of energy, comparatively unimportant, it is no longer the same thing if the method, that forms the object of our invention, is adopted, on account of the appreciable lowering in this expenditure of energy. That is why our invention includes a further important feature that consists in the recovery of the sensitive heat from the discharged materials by causing them to be delivered into a tank where they are cooled by a water circuit while use is made of the hot water obtained together with the water resulting from the condensing of the heating vapour for the preheating of the materials undergoing drying treatment.

According to another feature of our invention, the materials, after being brought in contact with the heating section traversed by the vapour supplied by the pressure boosting pump, come in contact with a heating unit, formed preferably by a set of superheated pipes through which passes vapour of greater pressure and temperature, so as to be subjected there to a further degree of drying, while use is made then of the excess amount that leaves the preheating warm section of the heating circuit that is fed mainly by the high-pressure unit.

Another important characteristic of our invention lies, in the fact that the drying treatment, inclusive possibly of the previous pre-heating and the cooling before final dicharge of the dried materials, is carried out continuously inside a column filled by the material that flows there by gravity according to a delivery that may be regulated at the foot of the column, through which pass series of exchange surfaces composed preferably of pipes traversed by heating and cooling fluids.

The drying plant may be linked up with a steam-generating unit in which the compression energy of the vapour is produced, while the heat lost from this unit is used to make up for the heat losses from the drying plant.

In the case when the materials to be treated might contain too high a percentage of moisture to flow properly by gravity continuously through the treatment column, provision is made in the invention for mixing a portion of the dried material with the crude material, which brings the moisture of the material to be treated down to a figure that avoids any caking of the material.

The invention may be adapted especially for the treatment of wet ores that have to be dried.

For the better understanding of our invention, a more detailed description will be now given taken with reference to the accompanying drawings in which:

Figure 2 shows a diagram of a plant of simpler design that is suitable for certain methods of working.

Figure 1:
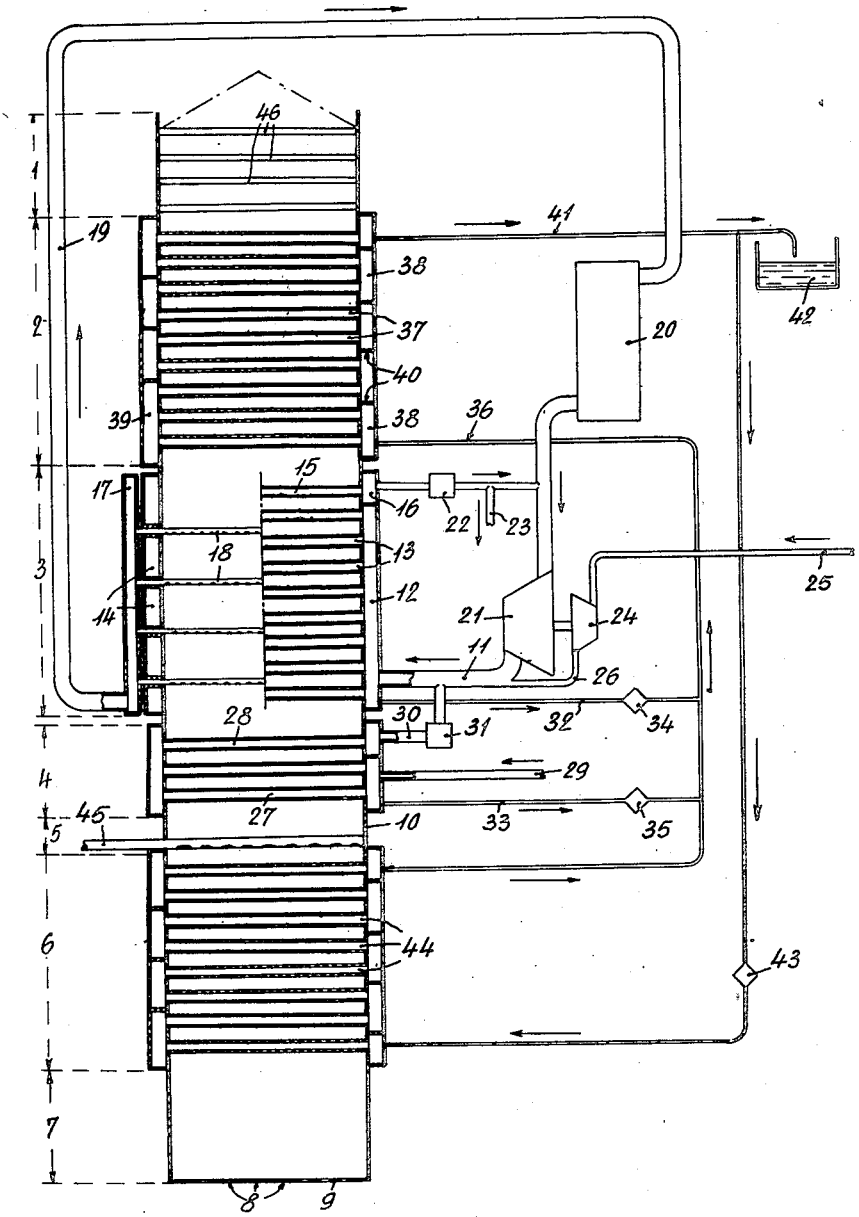
Figure 1 shows a diagram of an example of execution of equipment for the carrying-out of the method that forms the object of our invention.

In the example shown in Figure 1 the material to be dried flows by gravity one after another through a pre-heater, an evaporator, a superheater and a cooler that form following portions of the same parallelepiped column with vertical walls that includes from top to bottom the seven following sections: a loading hopper 1, taking the granular material to be dried, a pre-heater 2 with heating through water circulation for bringing the temperature of this material close to 100° C., an evaporator 3 with heating through steam circulation at higher temperature, a superheater 4 with heating by steam circulation at still higher temperature, a steam joint 5 with inlet of air at high pressure for forcing back the steam that might be drawn downwards with the falling material, a cooler 6 with cooling-water circulation and finally a discharger 7 from where the materials fall outside through adjustable openings 8 distributed evenly over the bottom plate 9 of the column. The adjustment of these openings 8 that may be made at one and the same time for each one of them enables a check to be made on the discharge of the granular material that fills the column of which the vertical walls have been denoted at 10.

The heating intended to ensure the evaporation of the moisture in the material is conducted in the section 3 through steam circulation in pipes that go through the column between two opposite walls; in the example as illustrated, the steam is delivered through a duct 11 into a header 12 that is built along one of the walls of the column and connects through pipes 13 with a header 14 along the opposite wall, while this header 14 joins up through pipes 15 with the non-condensed steam outlet chamber 16.

During the heat transfer that takes place through the walls of the pipes 13 between the steam inside the pipes and the outside material, the steam condenses inside the pipes, while the contained moisture of the material is evaporated. The steam thus formed, that contains dust and a small amount of indrawn air, is collected in a header 17, for instance through perforated pipes 18 going inside the column, or through any other means. This steam goes through a duct 19 into a dust-remover 20, then is compressed in a pressure boosting pump 21 that forces it through the duct 11. The small non-condensed portion of the steam that passes through the evaporator goes through a pressure-reducer 22 that regulates the pressure required inside the pipes 13—15. As this steam vapour is concentrated in air, a portion is discharged into the atmosphere at 23, while the remainder is sent back to the pressure boosting pump 21. In the drawing, it is assumed that this pressure boosting pump 21 is actuated by a steam turbine 24 fed through a duct 25, while the exhaust from this turbine is directed to the duct 11 through the pipe 26.

Pipes similar to pipes 13—15 and shown at 27—28 go through the superheater 4. These pipes are traversed by steam brough through the duct 29 and discharged at 30; the non-condensed steam leaving goes into a pressure-reducer 31 that regulates the relatively higher pressure required in the pipes 27—28, that is higher than that in tubes 13—15; on leaving the pressure-reducer 31, this steam goes into the heating circuit of the evaporator.

The condensate from the heating steam from the evaporator is collected through a duct at 32, while the condensate from the superheater is collected through a duct at 33 and pumps 34—35 force the condensate of ducts 32—33 through a duct 36 so as to cause it to go into pipes 37 that pass through the column in the preheating section 2; these pipes are connected up between headers 38—39 along opposite walls of the column and baffle plates 40 impart to the water a rising travel through superimposed pipes, so that the hot water reaches the foot of the pre-heater 2 through the duct 36, while the cooled water leaves it at the top through the duct 41. A portion of the cold water may be discharged at 42, while the remainder is picked up by a pump 43 to be sent back to the foot of the cooler 6, in which it goes through pipes 44 arranged like the pipes 37 of the pre-heater, the preheated water that leaves from the top of the cooler being sent to the foot of the preheater through the duct 36 with the condensates delivered by pumps 34—35. At the lower portion of the gap 5 that divides the cooler 6 from the superheater 4, high-pressure air is blown in, for instance through a layer of perforated pipes 45 that dip into the heart of the material being treated inside the column.

The loading hopper is furnished in its upper part with a protecting grid and contains bars 46 for breaking the fall of the material and intended to avoid any tendency of the material to be dried to cake under its own weight. These bars are arranged in a similar way to the pipes 13—15—27—28—37—44 and preferably have a similar outside shape.

In order not to overburden the figure, the steam-heating and discharge arrangements have not been shown in a superimposed position such as they are in actual fact. The steam discharge arrangements have not been shown at the preheating and superheating levels.

A description will now be given of the working of the equipment shown as an example in the accompanying drawings. The material to be dried, loaded in the hopper, fills the whole column, with its gravity flow regulated through the openings at the foot of the column. Below the loading hopper, the material, that comes in at a temperature close to that of the surrounding atmosphere, is preheated through its contact with the pipes 37 of the pre-heater 2, up to about 100° C., while the water going countercurrentwise through the pre-heater is let in at a temperature close to 100° C. and leaves at a temperature slightly greater than the surrounding temperature. The pre-heater 2 will be provided with a discharge system for the air-vapour mixture created in the heart of the bulk to be dried in order to avoid an increase of the pressure with the temperature of the gases included in this bulk: the air-vapour mixture withdrawn in an upper first portion of the pre-heater may be discharged to the atmosphere, while the air-vapour mixture in the warmer lower area, for instance below 95° C., will be headed towards the dust-remover 19.

The moist material preheated to about 100° C. then goes through the evaporator 3 just below the pre-heater and it flows round the pipes 13—15 through which travels steam for instance at 105° C. at an absolute pressure of about 1.2 kg. per sp. centimetre; the contained water is then evaporated as we have explained already and this evaporation is finished off in the superheater the object of which is to enable a thorough drying of the material to be effected, so as to avoid any later condensing that would hamper the work of the cooler. The superheater pipes are traversed for instance by steam at 110° C. at a pressure of 1.4 kg. per sp. cm.

After crossing the steam joint 5, the material goes through the cooler 6 so as to be cooled off there to a temperature close to the surrounding temperature.

When it happens that the crude material to be dried has too great a moisture content to avoid the formation of caking, this water content would be lowered by mixing in material already dried that would thus be "recirculated."

When the material to be dried includes coarse-grained portions in too large an amount to be handled merely by a protecting grid, it is screened beforehand, and the oversize is crushed if necessary to the required degree of fineness and then let into the drying circuit.

It will be observed that the placing one above the other of the portions marked 1 to 7 so as to constitute a column of uniform cross-section avoids the necessity of any handling in the inner drying circuit from the feed hopper 1 to the discharger 7.

The material to be dried comes into the plant in a wet condition and is dry when it is discharged, at a temperature close to the temperature at which it came in. The contained moisture is discharged in liquid form from the recirculating water circuit at a temperature close to the temperature of the material to be dried when it came into the plant.

There is a circulation, in the water circuits of the pre-heater and of the cooler, of deliveries corresponding respectively to the equivalent amounts of water of the deliveries of material to be dried and of dried material. The difference of these two equivalents in water corresponds approximately to the amount of the outputs of water condensed in the evaporator and in the superheater. Nevertheless the amount of water condensed is slightly greater than the amount of moisture content of the material to be dried.

The pre-heater cooler assembly is not necessary for the working of the drying plant. Yet it would be desirable not to leave out these parts on account of the increase in saving of heat that they provide.

It will be understood that the example of equipment, disclosed above and shown in Figure 1 of the accompanying drawings is in no way restrictive and that numerous structural changes might be introduced without going outside the scope of our invention of which the principle has been set out above. In addition, a description has been given only of the parts essential for an understanding of our invention and it is obvious that the plant may be provided with all the attachments such as driving members, steam generators, framework, pipe systems, valves, members for checking and adjustment that will be requisite for the completion of a plant from the constructive point of view. On the other hand, it may be observed that the temperatures and pressures of the circulating fluids might vary from those that have been indicated as an example.

It is evident that, in certain working cases, a certain amount of heat is available, with thermal standard close to that of which use is made in the evaporator and coming from outside sources.

An examination has brought out that this heat, in many cases, may be used to great advantage in the flowsheet as disclosed above, on condition that a corresponding alteration is made in the plants amounting to an appreciable simplifying made possible through the cutting-out of the superheater, the steam joint and the cooler, with this cooler becoming unnnecessary as a consequence of bringing in heat from an outside source and its elimination making the superheater and the steam joint no longer essential.

Our invention provides more particularly for use being made as condenser, for the steam drawn from an outside source, of members of the preheating stage; of the evaporator stage or of both these stages.

The heating of the preheater by a fluid with higher temperature than the heating water of which use is made according to Figure 1 enables a reduction to be made there of contact surfaces, which results in a lowering of the cost price and of the room required.

Our invention makes provision also for making use of the steam from an outside source for the driving of turbines connected to electric generators of which the current is used for driving by electric motors of additional equipment (such as handling and screening gear) in a treatment plant for granular materials as well as for driving of the pressure boosting pump for steam. This generation of electric energy offers the advantage of making the plant an entirely independent running unit.

Figure 2 shows an example of adaptation of the above-mentioned arrangements.

The successive stage of the drying column, through which pass from top to bottom the materials to be dried, include a loading hopper 51 exactly the same as that of Figure 1, a preliminary preheater 52 heated by the water that has been condensed in the evaporator, an extra preheater 53, heated by steam from an outside source, an evaporator 54 just the same as the evaporator 3 and a discharge hopper 55 exactly the same as the discharger 7.

In Figure 2 it is assumed that the steam from an outside source is generated in boilers such as 56 that supply steam to turbines 57, while the latter drive electric generators 58; the current derived from these generators is used for feeding the motors of extra equipment 59, such as appliances for handling and screening as well as the motors 60 that drive the compressors 61 intended to raise the pressure of the vapour removed under a pressure close to that of atmospheric pressure at 62 from the interior of the bulk of materials to be dried and forced into the evaporator at 63 at the same time as the non-condensed steam issuing from the heating section of the preheater 53 through the duct 64. This heating section is fed, by means of the duct 65, by the exhaust steam from the turbines 57.

The water resulting from the condensing of the steam heating of the evaporator 54 is collected at 66; a portion is sent back through the duct 67 to feed the heating section of the preliminary pre-heater 52; the discharge of the cooled water coming from the heating section of the preliminary pre-heater 52 is shown at 69.

The boilers 56 may be fed by the condensate of the steam used for the heating of the additional pre-heater 53, this water leaving from the heating section of this pre-heater at 70. This make-up portion is supplied possibly by the water collected at 68.

We declare that what we claim is:

1. A device for drying granular material comprising a tubular column, a hopper mounted on top of said column for the introduction therein of the material, a plurality of pipes extending laterally of and positioned throughout the length of said column, said pipes being spaced apart for the passage of said material therearound and preventing caking of said material, means supplying an initial group of said pipes with water at about 100° C. for preheating said material, means for supplying a following group of said pipes with steam at about 105° C. and a pressure of about 1.2 kg. per sq. centimeter for partially drying the falling material, means for supplying a further group of said pipes lower down in said column with steam at about 110° C. and a pressure of 1.4 kg. per sq. centimeter for completing the drying of the falling material, means for introducing air under pressure within the bulk of said falling material for forcing out the moisture vapor therefrom, means for supplying cool water through the remaining pipes in the lower end of said column for cooling said material, and means for conducting the water from the condensing of the steam in said drying pipes to said preheating pipes.

2. A device for drying granular material comprising a tubular column, a hopper mounted on top of said column for the introduction therein of the material, a plurality of pipes extending laterally of and positioned throughout the length of said column, said pipes being spaced apart for the passage of said material therearound and preventing caking of said material, means supplying an initial group of said pipes with water at about 100° C. for preheating said material, means for supplying a following group of said pipes with steam at about 105° C. and a pressure of about 1.2 kg. per sq. centimeter for partially drying the falling material, means for supplying a further group of said pipes lower down in said column with steam at about 110° C. and a pressure of 1.4 kg. per sq. centimeter for completing the drying of the falling material, means for introducing air under pressure within the bulk of said falling material for forcing out the moisture vapor therefrom, means for supplying cool water through the remaining pipes in the lower end of said column for cooling said material, and means for conducting water from said preheating pipes to said cooling pipes.

3. A device for drying granular material comprising a tubular column, a hopper mounted on top of said column for the introduction therein of the material, a plurality of pipes extending laterally of and positioned throughout the length of said column, said pipes being spaced apart for the passage of said material therearound and preventing caking of said material, means supplying an initial group of said pipes with water at about 100° C. for preheating said material, means for supplying a following group of said pipes with steam at about 105° C. and a pressure of about 1.2 kg. per sq. centimeter for partially drying the falling material, means for supplying a further group of said pipes lower down in said column with steam at about 110° C. and a pressure of 1.4 kg. per sq. centimeter for completing the drying of the falling material, means for introducing air under pressure within the bulk of said falling material for forcing out the moisture vapor therefrom, means for supplying cool water through the remaining pipes in the lower end of said column for cooling said material, a header mounted within said column near said preheating pipes, means connected to said header for withdrawing moisture vapor from the material through said header, a dust remover connected to said withdrawing means and a boosting pump connected to said dust remover and to said heating pipes for drawing said moisture vapor through said dust remover and forcing the cleaned vapor into said heating pipes.

4. A device for drying granular material comprising a tubular column, a hopper mounted on top of said column for the introduction therein of the material, a plurality of pipes extending laterally of and positioned throughout the length of said column, said pipes being spaced apart for the passage of said material therearound and preventing caking of said material, means supplying an initial group of said pipes with water at about 100° C. for preheating said material, means for supplying a following group of said pipes with steam at about 105° C. and a pressure of about 1.2 kg. per sq. centimeter for partially drying the falling material, means for supplying a further group of said pipes lower down in said column with steam at about 110° C. and a pressure of 1.4 kg. per sq. centimeter for completing the drying of the falling material, means for introducing air under pressure within the bulk of said falling material for forcing out the moisture vapor therefrom, means for supplying cool water through the remaining pipes in the lower end of said column for cooling said material, and means for conducting water from said cooling pipes to said preheating pipes.

5. A device for drying granular material comprising a tubular column, a hopper mounted on top of said column for the introduction therein of the material, a plurality of pipes extending laterally of and positioned throughout the length of said column, said pipes being spaced apart for the passage of said material therearound and preventing caking of said material, means supplying an initial group of said pipes with water at about 100° C. for preheating said material, means for supplying a following group of said pipes with steam at about 105° C. and a pressure of about 1.2 kg. per sq. centimeter for partially drying the falling material, means for supplying a further group of said pipes lower down in said column with steam at about 110° C. and a pressure of 1.4 kg. per sq. centimeter for completing the drying of the falling material, means for introducing air under pressure within the bulk of said falling material for forcing out the moisture vapor therefrom, means for supplying cool water through the remaining pipes in the lower end of said column for cooling said material, means for conducting steam from said drying pipes to said preceding partially drying pipes.

NOËL GOULOUNÈS.
ALBERT EDOUARD CAILLAT.

REFERENCES CITED

The following references are of record in the file of this patent:

UNITED STATES PATENTS

| Number | Name | Date |
|---|---|---|
| 128,707 | Card | July 9, 1872 |
| 278,356 | Niese et al. | May 29, 1883 |
| 1,391,510 | Schjelderup | Sept. 20, 1921 |
| 1,443,597 | Schwede | Jan. 30, 1923 |
| 2,406,509 | Pilo | Aug. 27, 1946 |
| 2,453,278 | Staples et al. | Nov. 9, 1948 |
| 2,492,132 | Payne et al. | Dec. 27, 1949 |
| 2,492,754 | Martin | Dec. 27, 1949 |
| 2,579,607 | O'Shaughnessy | Dec. 25, 1951 |

FOREIGN PATENTS

| Number | Country | Date |
|---|---|---|
| 487,256 | Great Britain | June 17, 1938 |